Aug. 23, 1960 L. A. FREEDMAN ET AL 2,950,346

TELEVISION RECEIVERS

Filed July 21, 1958 2 Sheets-Sheet 1

INVENTORS
LARRY A. FREEDMAN &
ROLAND N. RHODES
BY
W. H. Sprouagle
ATTORNEY

INVENTORS
LARRY A. FREEDMAN &
ROLAND N. RHODES
BY [signature]
ATTORNEY

United States Patent Office 2,950,346

Patented Aug. 23, 1960

2,950,346

TELEVISION RECEIVERS

Larry A. Freedman, New Brunswick, N.J., and Roland N. Rhodes, Levittown, Pa., assignors to Radio Corporation of America, a corporation of Delaware Filed July 21, 1958, Ser. No. 749,938

11 Claims. (Cl. 178—7.5)

This invention relates to television receivers and in particular to vertical retrace blanking circuits for use in television receivers employing transistors.

If the deflection beam of a television receiver kinescope is not suppressed during its vertical return or retrace movement, vertical retrace lines will appear on the screen of the kinescope. These lines are not desirable. In order to prevent, to a certain extent, the appearance of vertical retrace lines, the transmitted carrier wave signal contains vertical blanking information. The vertical blanking information is often not sufficient to completely suppress the vertical retrace lines. In a commercial television receiver using electron tube, large amplitude pulses are derived from the vertical deflection output transformer during the vertical retrace interval. These large amplitude pulses are usually applied to a beam intensity control electrode of the receiver kinescope to suppress the appearance of the vertical retrace lines on the face of the kinescope during the vertical retrace interval. In transistor television receivers it has been found possible to eliminate the usual deflection output transformer and to drive the kinescope vertical deflection yoke directly from the vertical deflection output transistor. Because the vertical output transformer is eliminated, however, the large amplitude pulses needed for vertical retrace blanking of the kinescope are not available.

It is accordingly an object of the present invention to provide an improved circuit for obtaining vertical retrace blanking of the kinescope of a transistor television receiver.

It is another object of the present invention to provide improved circuit means, in a transistor television receiver of the type employing a transformerless vertical deflection circuit, for obtaining vertical retrace blanking of the receiver kinescope.

Vertical retrace blanking in a television receiver is provided, in accordance with the invention, by deriving a relatively low magnitude signal from the vertical deflection circuit of the receiver during the retrace interval of the vertical deflection cycle. This signal is properly shaped and applied, together with the carrier wave signal, to a transistor video detector such that the transistor detector is rendered more conductive during the vertical retrace interval. The detected video output signal from the detector thus goes "blacker than black" and provides blanking of the beam of the kinescope during vertical retrace. Thus, blanking is provided in a transistor television receiver by means of the existing circuits of the receiver.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figures 1, 2:
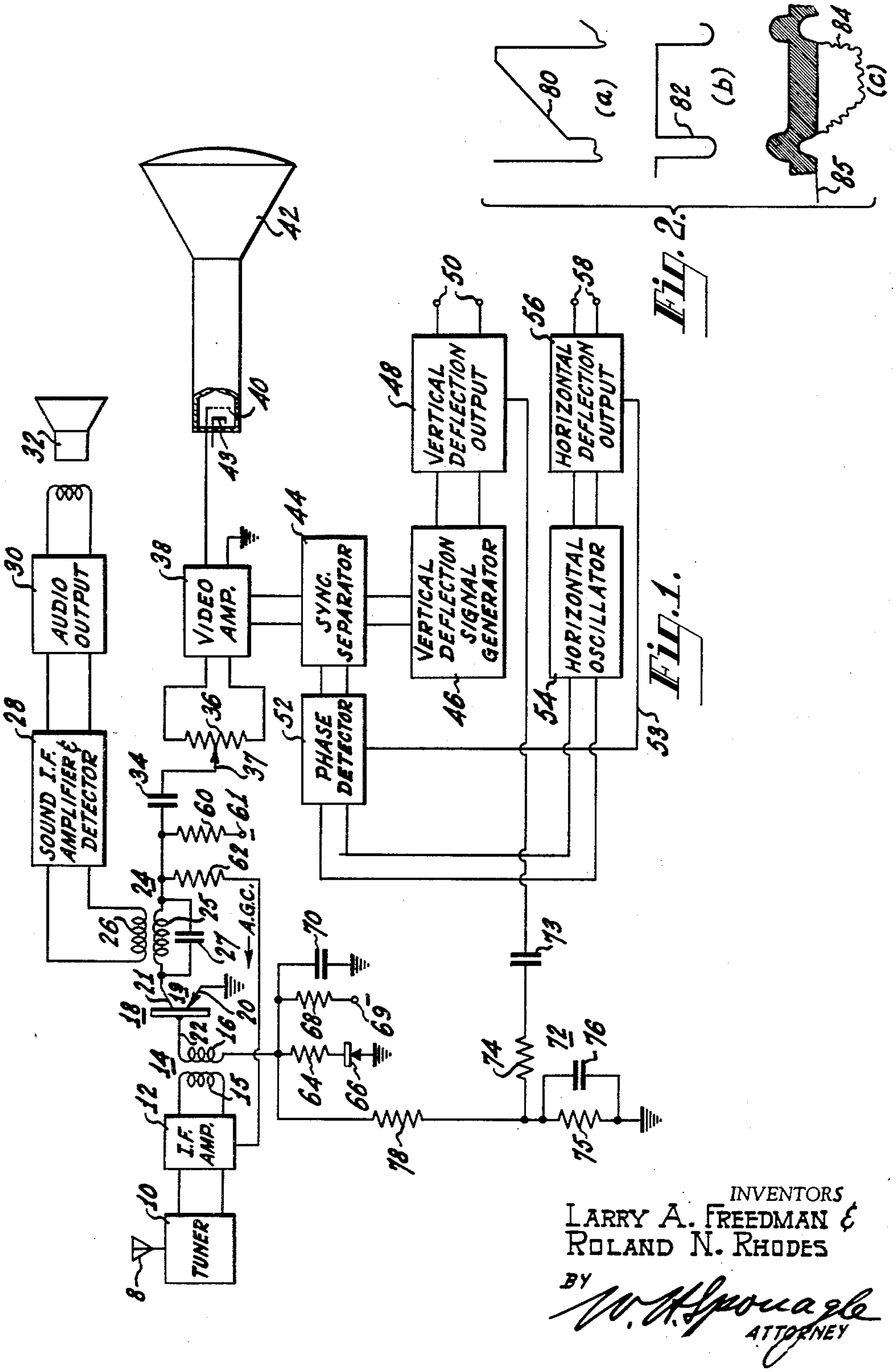
Figure 1 is a schematic circuit diagram, partially in block diagram form, of a transistor television receiver embodying the present invention.
Figure 2 are graphs illustrating the waveforms for certain portions of the receiver of Figure 1.
Figure 3:
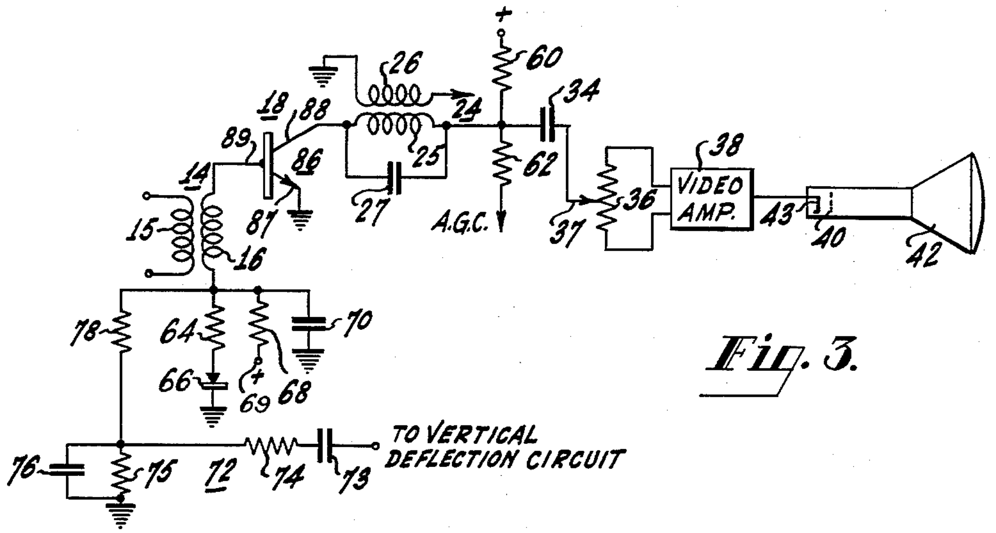
Figure 4:
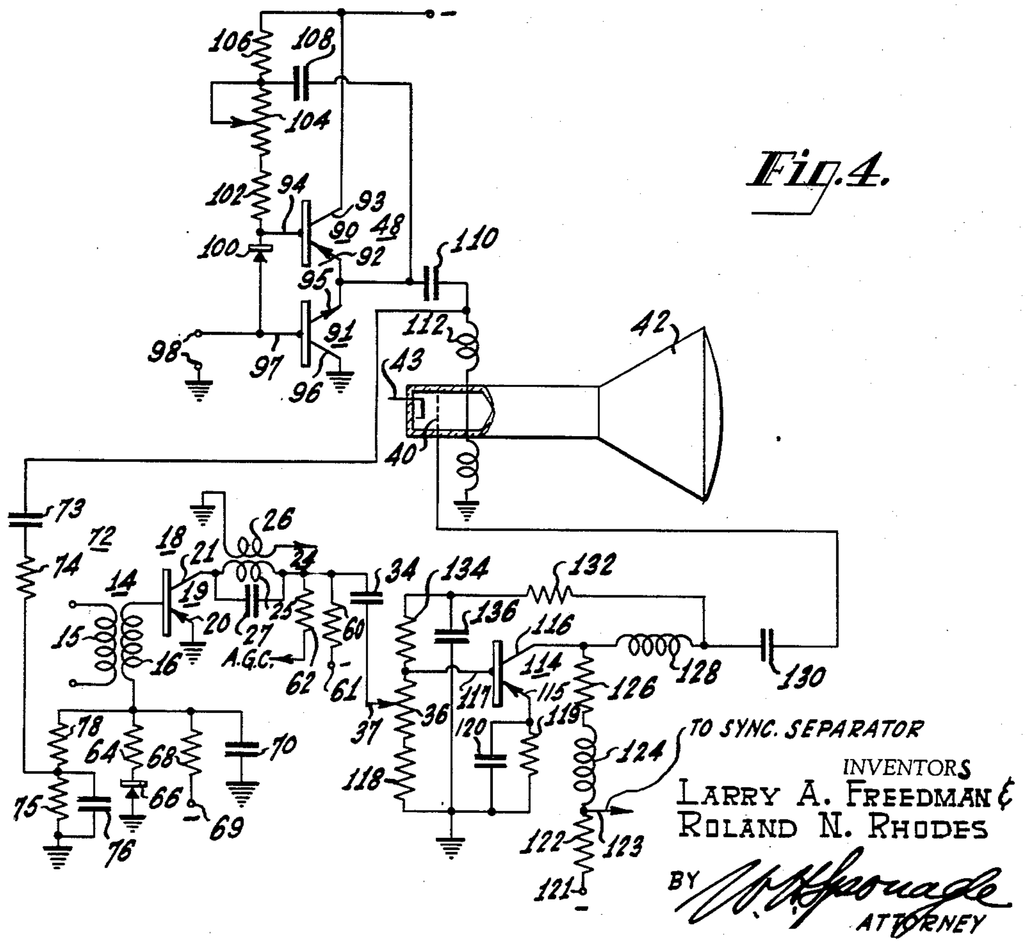

Figure 3 is a schematic circuit diagram, partially in block diagram form, of a transistor video detector and video amplifier circuit suitable for use in the receiver of Figure 1 and embodying the invention; and Figure 4 is a schematic circuit diagram of a transistor vertical deflection output circuit, transistor video detector, and transistor video amplifier suitable for use in the receiver of Figure 1 and embodying the invention.

Referring now to the drawings, wherein like parts are indicated by like reference numerals in all figures, and referring in particular to Figure 1, a television receiver includes an antenna 8 which receives composite television signals and which is coupled to apply the received signals to a tuner 10. The tuner 10 would normally include, as is conventional, a radio frequency amplifier and a frequency converter for converting the radio frequency signals to intermediate frequency signals. The intermediate frequency signals derived from the tuner 10 are amplified by an intermediate frequency amplifier 12 and applied through a transformer 14 to a video detector stage 18, which includes a transistor 19 which is operative to recover the composite television signals from the intermediate frequency signals. The transistor detector 19 may be considered to be of the P-N-P junction type and includes emitter 20, collector 21, and base 22 electrodes. Sound intermediate frequency signals (produced by the beat between the picture carrier and the modulated sound carrier) are derived from the second detector 18 and applied through a transformer 24 to the intermediate frequency amplifier and sound detector stage 28 where they are amplified and detected to provide an audio frequency signal. The audio frequency signal is amplified by the audio output amplifier 30 and applied to a loudspeaker 32 for sound reproduction.

The composite television signals derived from the second detector 18 are applied through a coupling capacitor 34 and a variable resistor or potentiometer 36 to a video amplifier 38, which amplifies the composite signals and applies them to the control grid 40 of a kinescope 42 for picture reproduction. It will be assumed that the video amplifier 38 provides signal phase reversal between its input and output circuits. The composite television signals are also applied to a sync separator circuit 44 which supplies vertical synchronizing pulses to a vertical deflection signal generator 46. The vertical deflection signal generator 46 is connected to a vertical deflection output circuit 48 which includes a pair of output terminals 50 connected conventionally to the terminals of the kinescope vertical deflection yoke winding (not shown).

Horizontal synchronizing pulses derived from the sync separator circuit 44 are applied to a phase detector 52. The phase of the horizontal synchronizing pulses is compared by the phase detector 52 with the phase of a sawtooth wave, which may be derived from the horizontal deflection output circuit 56 and applied to the phase detector through the lead 53. The error voltage developed in the phase detector 52 as a result of such phase comparison is applied to a horizontal oscillator 54 to synchronize its output with the received synchronizing pulses. The horizontal oscillator 54 is operative to generate a train of pulses having the repetition rate of the received horizontal synchronizing pulses. The horizontal oscillator 54 is connected to the horizontal deflection output stage 56, the output terminals 58 of which are connected conventionally to the horizontal deflection yoke windings (not shown) of the kinescope 42. As thus far described, the receiver is conventional.

Referring now specifically to the video detector transistor 19 and its associated circuitry, the picture and sound IF carrier signals are applied from the IF amplifier 12 to the primary winding 15 of the signal input transformer 14 for the detector circuit. The secondary winding 16 serves to develop the intermediate frequency signal thereacross from which it is applied directly to the base electrode 22 of the detector transistor 19. The emitter electrode 20 of the detector transistor 19 is connected directly to ground or a point of reference potential for the receiver, and the collector electrode 21 is connected through the primary winding 25 of the transformer 24 and a load resistor 60 to a negative direct current supply source (not shown). A capacitor 27 is connected in parallel with the primary winding 25 and the combination is tuned to the intercarrier sound signal of 4.5 megacycles. The picture IF carrier signal is detected in the base-to-emitter circuit of the transistor 19 to provide a video output signal which includes the deflection synchronizing information. Since the detector circuit is the base-to-emitter circuit of the transistor 19, the detected signals are also amplified and developed across the load resistor 60, from which they are applied through the coupling capacitor 34 to a variable tap 37 on the potentiometer 36. The potentiometer 36 serves as a contrast control for the receiver, since the position of the tap 37 on the potentiometer 36 determines the amplitude of the signal applied to the video amplifier 38 and hence the amplitude of the output signal of the video amplifier.

The transistor detector 19 also is operative to develop an automatic gain control (AGC) signal. This signal, the amplitude of which varies in accordance with variations in the amplitude of the intermediate frequency signal, is derived from the collector of the transistor detector 19. The AGC signal is applied through a resistor 62 to the IF amplifier 12 and controls its gain as an inverse function of the strength of the received signal, and thus the IF signal, to provide the desired gain control of the receiver.

The base 22 of the transistor detector is connected through the secondary winding 16 of the detector input transformer 14, a resistor 64 and a semi-conductor diode 66 to ground. The base 22 is also connected through the secondary winding 16 and a resistor 68 to a negative direct current supply source (not shown). The resistor 68 is by-passed for intermediate frequency signals by a capacitor 70. The network comprising the resistors 64 and 68 and the diode 66 provides a temperature responsive bias voltage for the base-emitter circuit of the transistor detector 19, thus stabilizing the operating point of this transistor with variations in ambient temperature.

To provide vertical retrace blanking of the receiver, in accordance with the invention, the vertical deflection output circuit 48 is connected through a filter or shaping network 72, a resistor 78, and the primary winding 16 of the transformer 14 to the base 22 of the transistor detector 19. By this connection, the vertical yoke voltage is derived from the vertical deflection output circuit and shaped by the network 72 to provide pulses at the field frequency of the receiver which are applied to the base 22 of the transistor detector 19. These pulses, thus, are combined with the video signal impressed upon the detector 19 and provide vertical retrace blanking of the receiver.

In explaining the operation of the receiver, reference will be jointly made to the receiver of Figure 1 and the waveforms of Figure 2. The vertical yoke voltage is shown graphically by the waveform 80 of Figure 2 and is of generally sawtooth waveform. This voltage is derived from the vertical deflection output circuit and applied to the filter or shaping network 72. The network 72 includes a series capacitor 73 and resistor 74 and the parallel combination of a resistor 75 and capacitor 76, which is connected from the junction of the resistors 74 and 78 to ground. This network has a frequency characteristic such that the yoke voltage 80 is shaped into negative pulses 82 having a repetition rate corresponding to the field frequency of the receiver. The amplitude of the pulses 82 as applied to the base 22 of the transistor detector 19 is determined by the resistor 78 in combination with the temperature responsive circuit including the diode 66. In a typical example, the amplitude of the pulses at the base 22 of the transistor detector 19 may be 25 millivolts negative.

The negative pulses applied to the base 22 of the transistor detector 19 are added to the composite television signal. The transistor detector 19, since it is of N type conductivity, is rendered more conductive upon application of the negative pulses. The combination of the applied IF signal and the negative pulses thus provide a video output signal as shown by the waveform 84 of Figure 2(*c*). The black level of the video output signal at the collector 21 of the transistor video detector 19 is indicated at 85. As the transistor 19 becomes more conductive due to the application of the pulses 82 and the IF signal to the base 22, the video output signal at the collector becomes more positive and is blacker than black as indicated by the waveform shown in Figure 2(*c*). The video output signal from the detector is applied to the video amplifier 38. Since the video amplifier 38 exhibits a phase reversal between its input and output circuits, the video output signal applied to the grid 40 of the kinescope 42 becomes more negative during the retrace interval. This produces vertical blanking of the receiver kinescope 42 and prevents the appearance of vertical retrace lines on the face of the kinescope 42.

It is to be noted that, in a portable television receiver, the available voltage at the vertical yoke is normally in the order of the supply voltage, which typically may be 12 volts. This voltage would normally be of insufficient magnitude to provide vertical blanking of the kinescope. By adding this voltage to the relatively low level carrier wave signal which is applied to the video detector, however, the video output signal therefrom is made blacker than black and provides the desired vertical retrace blanking. This result is accomplished without the need for additional circuitry aside from the shaping network 72. Moreover the application of the negative pulses to the transistor video detector 19 does not adversely affect the intercarrier sound signal at the output thereof. Testing of the impulse noise performance of a transistor receiver embodying the invention has indicated no degradation due to the presence of the blanking circuit.

In Figure 3, reference to which is now made, a video detector circuit is illustrated which is substantially similar to the circuit of Figure 1 except that the video detector stage 18 employs a transistor 86 of P type conductivity. The transistor 86 may be considered to be a junction transistor of the N-P-N type and includes an emitter 87, a collector 88, and a base 89. The circuit connections for the transistor detector are the same as the transistor detector of Figure 1, except that the polarity of the biasing voltages is reversed and the temperature compensating semi-conductor diode 66 is poled in the circuit in an opposite direction. The various waveforms of the circuit of Figure 3 will also be reversed in polarity from the corresponding waveforms of Figure 1. Accordingly, the transistor detector 86 will become more conductive upon application of positive pulses to its base electrode 89. The video output signal from the transistor detector 86 will become blacker than black as it becomes increasingly negative in response to the positive pulses from the vertical deflection circuit. Since, however, the black level at the output of the detector is in the negative direction, the video amplifier 38 (which provides phase reversal between its input and output circuits) is connected with the cathode 43 of the kinescope 42 rather than with the grid to provide the desired vertical retrace blanking.

In Figure 4, reference to which is now made, the vertical deflection output circuit 48 comprises a pair of transistors 90 and 91 of opposite conductivity types which are connected for class B push-pull operation. The output transistor 90 is of the P-N-P junction type and includes an emitter 92, a collector 93, and a base 94. The output transistor 91 is of the N-P-N junction type and includes an emitter 95, a collector 96, and a base 97. Deflection signals are applied to the output transistors through a pair of input terminals 98, one of which is grounded and the other of which is connected directly with the base 97 of the transistor 91 and through a semi-conductor junction diode 100 to the base 94 of the other transistor 90. The semi-conductor diode 100 provides a temperature sensitive threshold bias for the output transistors 90 and 91. The transistors 90 and 91 are connected in series for direct current. To this end, the collector 96 of the N-P-N transistor 91 is connected directly to ground, while the output or emitter electrodes 95 and 92 of the transistors are connected directly together. The collector 93 of the P-N-P transistor 90 is connected to the negative supply terminal. The base 94 of the output transistor 90 is connected through three resistors 102, 104, and 106 to the negative supply terminal. The resistor 104 is variable and provides a means for controlling vertical size. A capacitor 108 is connected from the emitters of the output transistors to the junction of the resistors 104 and 106 and provides signal feedback from the output circuit to the low impedance input biasing network, thus providing a high dynamic input impedance and efficient signal transfer. The emitters 92 and 95 of the output transistors are capacitively coupled through an output coupling capacitor 110 to the vertical yoke coil or windings 112, which are returned to ground.

The yoke voltage at the junction of the capacitor 110 and the yoke coil 112 is the same as the one shown by the waveform 80 illustrated in Figure 2(*a*). This voltage is applied through the shaping network 72, the resistor 78, and the secondary winding 16 of the input coupling transformer 14 to the base 22 of the transistor detector 19. The circuit connections for the transistor detector 19 are identical to the circuit connections in Figure 1.

The collector 21 of the transistor detector 19 is connected through the primary winding 25 of the intercarrier sound take off transformer 24 and the coupling capacitor 34 to the variable tap 37 of the volume control resistor 36. The high signal voltage terminal of the volume control resistor 36 is connected directly with the base 117 of a video amplifier transistor 114 while the other terminal is connected through a resistor 118 to ground. The video amplifier transistor 114 may be considered to be a P-N-P junction transistor and includes, in addition to the base 117, an emitter 115 and a collector 116. The emitter electrode 115 of the video amplifier transistor 114 is connected to ground through a degenerative stabilizing resistor 119. The stabilizing resistor 119 is by-passed for video signals by a by-pass capacitor 120. The collector electrode 116 of the transistor 114 is supplied with a negative operating potential from a terminal 121, which is connected to the collector 116 through a synchronizing signal resistor 122, a choke coil 124, and a second resistor 126. The synchronizing components of the video signals are developed across the resistor 122 and applied to the sync separator circuit of the receiver through a lead 123. Amplified video signals available at the collector electrode 116 are applied through a peaking coil or inductor 128 and a coupling capacitor 130 to the control grid 40 of the kinescope 42.

To provide the desired amplitude and phase response of the transistor video amplifier 114 a feedback network is provided between the output circuit and input circuit thereof. This feedback network comprises first and second feedback resistors 132 and 134 which are connected in series between the base electrode 117 and the terminal of the peaking coil 128 remote from the collector 116. A phase shifting capacitor 136 is connected from the junction of the resistors 132 and 134 to ground for the receiver. The feedback network is operative to apply a signal from the load or output circuit to the input of the transistor video amplifier to provide a flat frequency response characteristic for the transistor 114. The video amplifier illustrated is of the type disclosed and claimed in a copending application for Thomas O. Stanley and Roland N. Rhodes filed on March 27, 1958, Serial No. 724,450, entitled Video Amplifier.

The circuit of Figure 4 operates in a manner similar to the one shown in Figure 1 to provide vertical blanking by increasing conduction of the transistor detector 19 during the vertical retrace interval. To provide a video output signal from the video amplifier transistor 114 which is blacker than black, the video signal from the detector is applied between the base and emitter electrodes of the video amplifier transistor 114. There is a phase reversal between the base and collector electrodes of the video amplifier transistor 114, so that when the signal from the detector goes blacker than black the output signal which is applied to the grid 40 of the kinescope 42 becomes less positive to provide the required vertical retrace blanking.

A circuit of the type illustrated in Figure 4 has been built and successfully operated using the following values for the various circuit components:

| | |
|---|---|
| Transistors 19 and 114 | Type 2N384 and TA1629, respectively. |
| Diode 66 | Type TA134. |
| Resistors 36, 118, and 119 | 5,000; 680; and 470 ohms, respectively. |
| Resistors 132 and 134 | 39,000 and 47,000 ohms, respectively. |
| Capacitor 136 | 3.3 micromicrofarads. |
| Resistors 122 and 126 | 1,000 and 12,000 ohms, respectively. |
| Inductors 128 and 124 | 200 and 1,300 microhenries, respectively. |
| Capacitor 130 | 0.1 microfarads. |
| Resistor 60 | 47,000 ohms. |
| Resistor 64 and 68 | 56 and 8,100 ohms, respectively. |
| Capacitor 70 | 0.1 microfarads. |
| Resistors 74, 75, and 78 | 3,300; 1,200; and 3,300 ohms, respectively. |
| Capacitors 73 and 76 | 0.25 microfarads each. |
| Vertical yoke 112 | 4.2 millihenries and 4.5 ohms. |
| Voltage at terminal 61 | 100 volts (negative). |
| Voltage at terminal 69 | 12 volts (negative). |
| Voltage at terminal 135 | 130 volts (negative). |

By applying a voltage derived from the vertical yoke, along with the carrier wave signal, to the input of the transistor video detector of a television receiver, the transistor detector is rendered more conductive during the retrace interval. Thus, vertical blanking is provided using relatively low amplitude pulses without the need for separate blanking circuits. The invention is, therefore, particularly adaptable for use in transistor television receivers in which the vertical deflection circuits are transformerless.

What is claimed is:

1. In a television receiver, the combination with a kinescope and a vertical deflection circuit therefor, of a transistor video detector, means for applying a carrier wave signal to said transistor detector, means for deriving a voltage from said vertical deflection circuit and for applying said voltage to said transistor detector to cause increased conduction thereof during the retrace interval of the vertical deflection cycle, means for deriving an output signal from said transistor detector, and means for applying said output signal to said kinescope to provide vertical blanking thereof during said retrace interval.

2. In a television receiver, the combination with a kinescope vertical deflection circuit providing a voltage of predetermined frequency, of a transistor video detector connected for common emitter operation in said receiver for detecting a composite television signal to provide a video output signal for application to said kinescope, and means for applying said voltage to said transistor video detector to provide increased conduction thereof during the retrace portion of the vertical deflection cycle of said receiver and a video output signal of a polarity and magnitude to provide vertical retrace blanking of said kinescope.

3. In a television receiver, the combination with a kinescope and a vertical deflection circuit therefor, of a transistor video detector including base, emitter, and collector electrodes and connected for common emitter operation, means for applying a carrier wave signal to the base electrode of said transistor detector, means for deriving a voltage from said vertical deflection circuit and for applying said voltage to the base electrode of said transistor detector to cause increased collector current conduction thereof during the retrace interval of the vertical deflection cycle, means for deriving a detected video output signal from the collector electrode of said transistor detector, and means for applying said video output signal to said kinescope to provide vertical blanking thereof during said retrace interval.

4. In a television receiver, the combination with a kinescope and a vertical deflection circuit therefor providing a deflection voltage of predetermined frequency, of a video detector transistor having base, emitter, and collector electrodes and connected for common emitter operation, means for applying a composite television signal to said base electrode to provide a video output signal at said collector electrode, means including a video amplifier for applying said video signal to said kinescope, and means for applying pulses corresponding to said deflection voltage to the base electrode of said detector transistor to provide increased collector current conduction thereof during the vertical retrace interval of the vertical deflection cycle of said receiver and an increase in the amplitude of said video output signal to a blacker than black video level, whereby vertical retrace blanking of said kinescope is provided.

5. In a television receiver, the combination with a kinescope and a video detector, of means providing increased conduction of said video detector during the vertical retrace interval of the vertical deflection cycle of said receiver to provide a blacker than black video output signal, and means for applying said video signal to said kinescope to provide vertical blanking thereof during said retrace interval.

6. In a television receiver, the combination with a transistor vertical deflection output circuit, a vertical deflection winding, and a capacitor connecting said output circuit with said deflection winding for applying a deflection signal thereto of predetermined frequency, of a video detector transistor including base, emitter, and collector electrodes and connected for common emitter operation, means for applying a composite television signal to said base electrode, means for deriving a deflection voltage from the junction of said capacitor and said vertical deflection winding, means including a filter network for shaping said deflection voltage to provide pulses at said predetermined frequency and of a polarity to provide with said carrier wave signal increased conduction of said detector transistor during the retrace interval of the vertical deflection cycle of said receiver, means for applying said pulses to the base electrode of said detector transistor to render the video output signal therefrom blacker than black, means for deriving said video output signal from said collector electrode, and means including a video amplifier circuit for applying said video signal to said kinescope to provide vertical blanking thereof during said retrace interval.

7. In a television receiver, the combination with a kinescope having a vertical deflection winding, of a vertical deflection circuit for applying a deflection signal of predetermined frequency and having a trace portion and a retrace portion to said vertical deflection winding, a transistor video detector, means for applying a composite television signal to said transistor detector, means for deriving a signal of said predetermined frequency from said vertical deflection winding and for applying said signal to said transistor detector to cause increased conduction thereof and provide a video output signal which is blacker than black during the retrace interval of the vertical deflection cycle, and means for applying said video output signal to said kinescope to provide vertical blanking thereof during said retrace interval.

8. A vertical blanking circuit for a television receiving system having an image reproducing device comprising, in combination, a transistor video detector connected to detect composite television signals to provide a video output signal, means including said composite television signals and a separate source of signals coupled with said transistor detector for rendering the video output signal from said detector blacker than black during the retrace interval of the vertical deflection cycle of said receiver, and means for applying the video output signal from said transistor detector to said kinescope to provide vertical blanking thereof during said retrace interval.

9. In a television receiver, the combination with a kinescope and a vertical deflection output circuit therefor, of a transistor video detector, means for applying a carrier wave signal to said transistor detector, means for deriving a voltage from said vertical deflection output circuit and for applying said voltage to said transistor detector to cause increased conduction thereof to a blacker than black level during the retrace interval of the vertical deflection cycle, means for deriving a detected video output signal from said transistor detector, and means including a video amplifier for applying said detected video output signal to said kinescope to provide vertical blanking thereof during said retrace interval.

10. In a television receiver, the combination defined in claim 9 wherein said kinescope includes a control grid and said video amplifier applies said video output signal to said control grid.

11. In a television receiver, the combination defined in claim 9 wherein said kinescope includes a cathode and said video amplifier applies said video output signal to said cathode.

References Cited in the file of this patent

UNITED STATES PATENTS

| | | |
|---|---|---|
| 2,202,612 | Urtel | May 28, 1940 |
| 2,203,521 | Cawein | June 4, 1940 |